Patented Sept. 2, 1924.

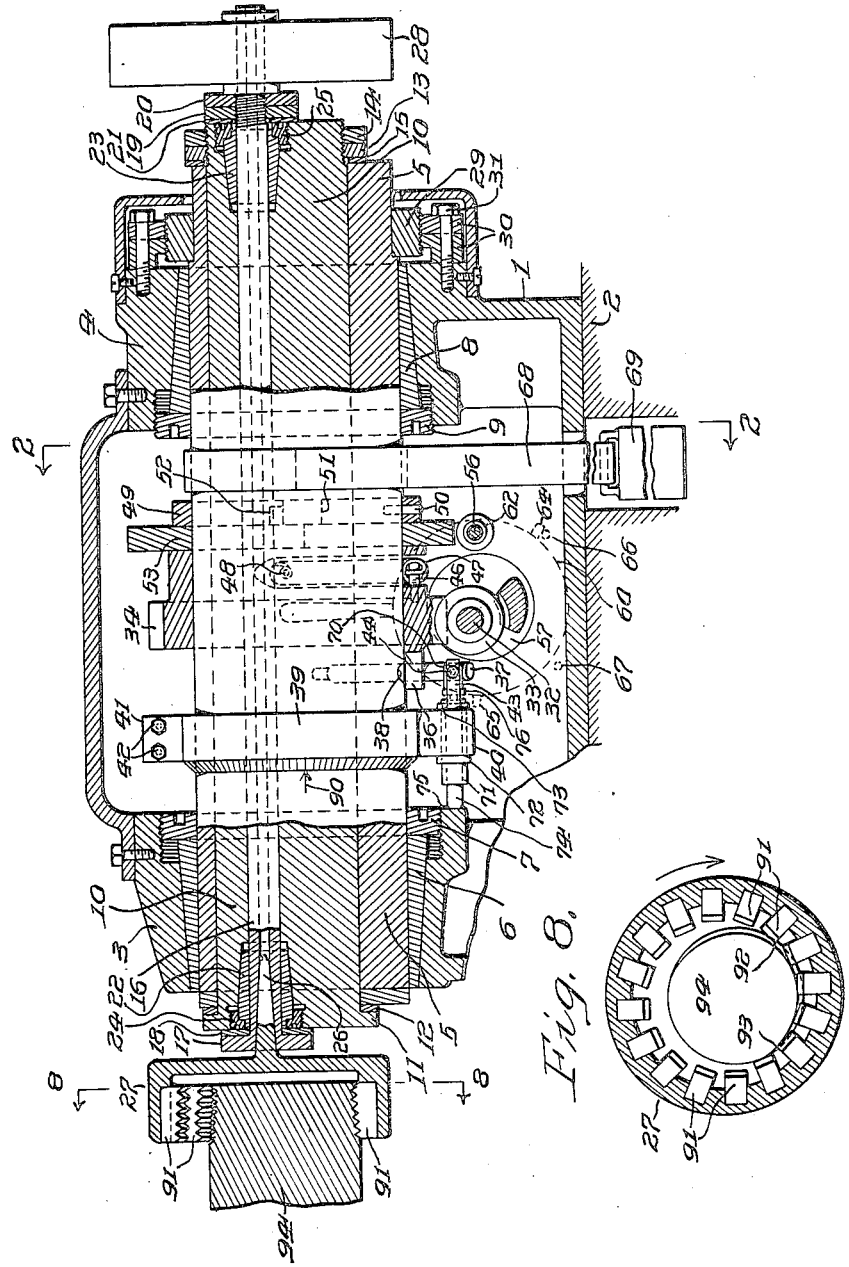

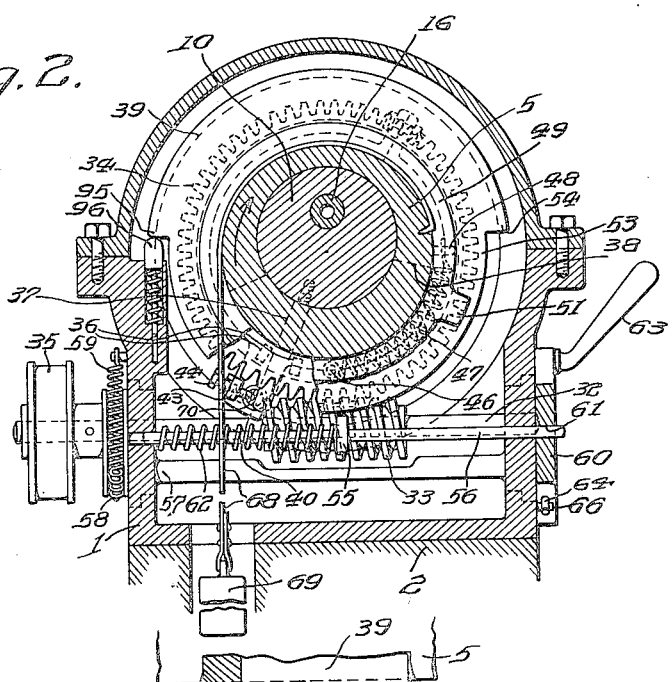

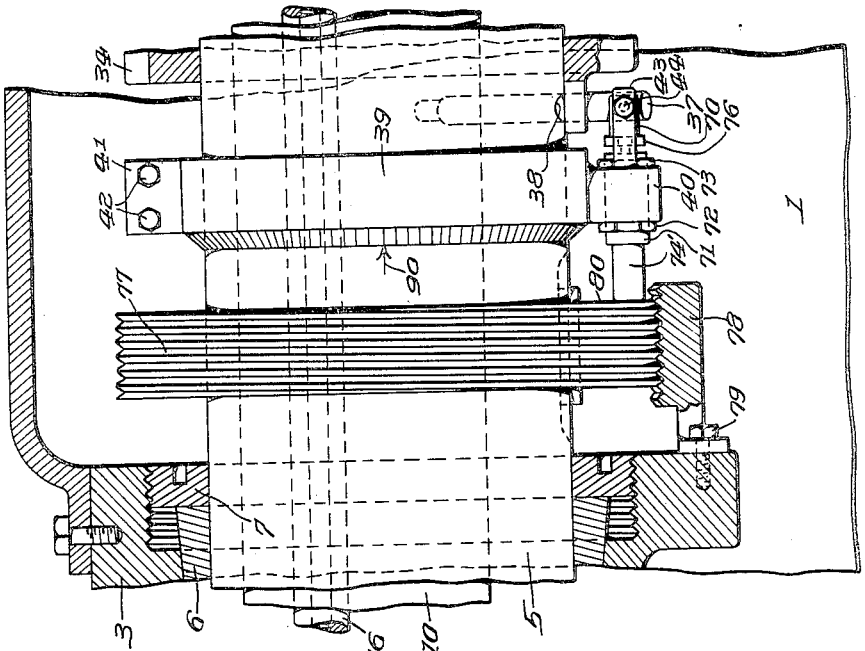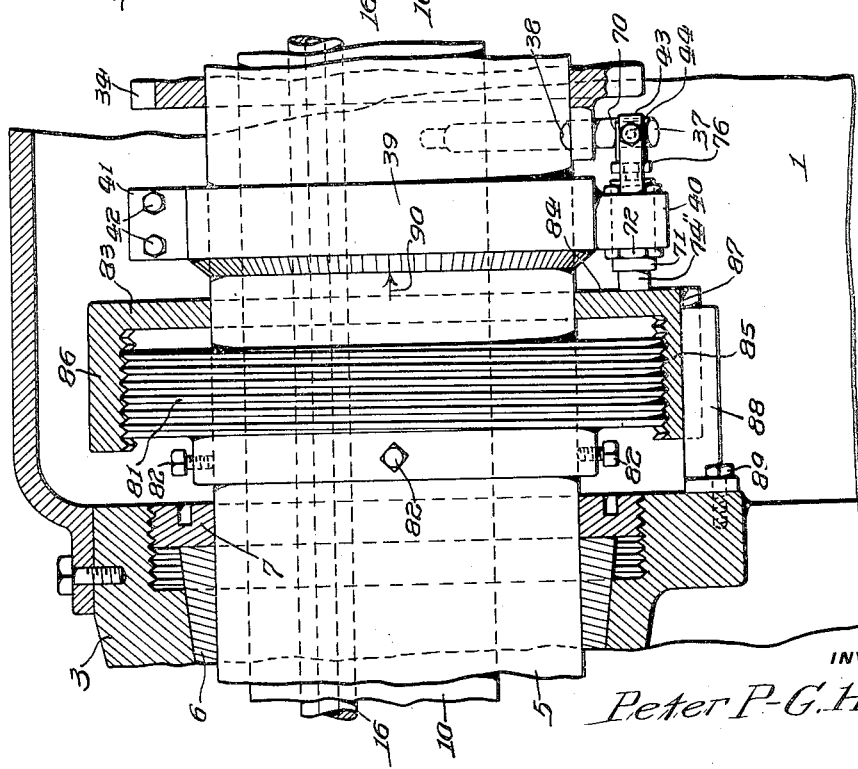

1,507,235

UNITED STATES PATENT OFFICE.

PETER P-G. HALL, OF PHILADELPHIA, PENNSYLVANIA.

METHOD OF AND MACHINE FOR MILLING TAPERED THREADS.

Application filed September 22, 1919. Serial No. 325,399.

*To all whom it may concern:*

Be it known that I, PETER P-G. HALL, a citizen of the United States, and a resident of the city of Philadelphia, in the county of Philadelphia, State of Pennsylvania, have invented certain new and useful Improvements in Methods of and Machines for Milling Tapered Threads, of which the following is a specification.

This invention relates to a planetary metal working machine, of the type disclosed in U. S. Letters Patent No. 1,316,718 granted to me September 23, 1919, capable in one of its uses for operation as a thread milling mechanism adapted to cut threads in a piece of work in a substantially single relative circuit or orbital movement between a cutting tool and the piece of work whereby a smooth and correct continuous screw thread is obtained.

An object of this invention is therefore to provide an improved mechanism to produce either external or internal threads on a piece of work.

Another object is, more particularly, to provide such mechanism with novel and useful means whereby properly formed tapered threads may be produced or obtained and also whereby such threads may be produced upon tapered or conical surfaces if desired.

Another object is to provide such mechanism with means whereby a relative helical movement between a rotating cutter, also tapered, and the work operated upon may be obtained for cutting the thread segments in plurality simultaneously and relatively rapidly whereby a complete thread may be produced in a single relative circuit or orbital movement of the tool and the piece of work.

A still further object is to provide such mechanism with means adapted to produce such threads in any desired pitch and taper as may be previously determined upon.

A still further object is to provide such mechanism with means for automatically carrying out all of the operations necessary to produce such threads.

A still further object is to provide such mechanism with means for performing other milling operations aside from merely cutting threads, such as boring, drilling and the like.

It is to be understood that my invention is not limited to the particular details herein described and illustrated upon the accompanying drawing nor to the particular use and arrangement of parts suggested herein, but that the same is capable of a wider range of uses, arrangements or associations of parts readily apparent to those skilled in the art without departing from the spirit of my invention and the scope of the appended claims, the particular embodiments shown in the accompanying drawings being given merely as exemplifications of means for reducing my invention to practice and for the purpose of illustration and not with the intent of limiting the invention to the particular embodiments disclosed.

Referring to the drawing in which the same reference characters are used to designate corresponding parts in the several views;

Fig. 1 is a longitudinal sectional view of one embodiment of my invention with parts shown in elevation, Fig. 2 is a transverse sectional view taken on the line 2—2 of Fig. 1.

Fig. 3 is an enlarged fragmentary longitudinal sectional detail view of one form of means for effecting radial movement of the cutter, with parts shown in elevation.

Fig. 4 is an enlarged fragmentary detail end view showing the position of certain of the parts during operation.

Fig. 5 is an enlarged fragmentary detail bottom plan view of certain of the means shown in Fig. 4.

Fig. 6 is an enlarged fragmentary longitudinal sectional view of another form of means for effecting radial movement of the cutter, with parts shown in elevation.

Fig. 7 is a similar view of still another form of such means.

Fig. 8 is a sectional view taken on line 8—8 of Fig. 1, showing the operation of a female type of cutter upon a piece of work.

In the embodiments shown the mechanism is used as a planetary thread milling device adapted to operate upon a preferably stationarily supported piece of work to mill either internal or external threads therein. For this purpose means are provided to move a tapered milling tool to initial cutting position for any desired depth or diameter of thread to be cut and to give the tool a combined planetary, longitudinal and radial movement to thus obtain a tapered or conical helical relative movement between the work and the tool while the tool is rotated. By providing the tool with a plurality of cutting elements, a single planetary circuit or orbital movement of the tool will cause a plurality of thread segments to be simultaneously cut in the work, or if a single cutting element be used, the same may be given a plurality of circuits to obtain the same result. At the end of the cycle of operation, means may be provided to release the driving mechanism, to stop the helical movement of the tool and thereupon return the mechanism to the original or initial position, these movements being preferably performed automatically.

Referring now more particularly to the drawing there is illustrated therein a mechanism having a casing 1 secured in any appropriate manner to the machine bed 2 of any suitable type. The casing comprises forward and rear bearing housings 3 and 4 respectively, which are axially alined and in which is mounted a rotatable supporting member 5, preferably cylindrical in form, the latter being supported at its forward end in a split tapered bearing member 6 maintained in place by an annular spanner thrust nut 7 threaded into a suitable aperture in the bearing housing 3, and at its rear end in a split tapered bearing member 8 maintained in place by an annular spanner thrust nut 9 threaded into a suitable aperture in the bearing housing 4.

Eccentrically mounted in the supporting member or cylinder 5 and extending longitudinally thereof is a second or inner cylinder or shaft 10 having its forward end provided with a thrust flange 11, between which and the forward end of the cylinder 5 may be interposed a thrust washer 12. The rear end of the cylinder or shaft 10 may be provided with screw threads for securement thereto of a thrust nut 13 and a lock nut 14, a thrust washer 15 being interposed between the thrust nut 13 and the rear end of the cylinder 5.

Within the inner cylinder or shaft 10 is eccentrically mounted and longitudinally disposed a rotatable spindle shaft 16 with its ends projecting beyond the ends of the cylinder or shaft 10 and provided at its forward end with a thrust flange 17 and a thrust washer 18, and at its rear end with a thrust nut 19, a lock nut 20 and a thrust washer 21 for preventing relative longitudinal movement of the shaft 16 in the cylinder or shaft 10 but permitting rotation of the shaft 16 therein. In the ends of the cylinder or shaft 10 and surrounding the shaft 16 also may be provided tapered bearing members 22 and 23 and spanner thrust nuts 24 and 25 for rotatably supporting the shaft 16, similarly to the means for rotatably supporting the cylinder or supporting member 5 in the bearing housings 3 and 4, hereinbefore described.

The forward end of the shaft 16 may be internally tapered to receive the tapered shank 26 of a cutting tool 27, the form of tool herein disclosed being of the female type hereinafter more fully described, although other forms of tools may be employed if desired. At the rear projecting end of the shaft 16 is secured in any suitable manner a belt pulley 28 by which the shaft 16 and the cutting tool may be rotated.

The cylinder or supporting member 5 is adapted to be given a helical movement to revolve the tool 27 in a circular or orbital path, (the movement of the tool, by reason of its rotation with the shaft 16 combined with the circular or orbital movement above mentioned, being in a planetary path about the piece of work operated upon), and also to feed the tool longitudinally to effect the cutting of a plurality of threads simultaneously during a single circuit or orbital movement thereof, or if desired, the cutting of several threads successively during a plurality of circuits or orbital movements, as well as for obtaining the proper pitch of the threads in either case.

For the purpose of feeding the cylinder or supporting member 5, and the parts supported thereby, longitudinally when the same are rotating, the cylinder or supporting member 5 may have secured thereto, for rotating therewith, a suitable master thread 29, preferably near the rear end of the cylinder 5, adapted to cooperate with a lead nut 30 stationarily fastened in any convenient manner to the rear end of the casing 1 or housing 4, as by screws 31, such master screw and lead nut being replaceable by others in accordance with the particular pitch of thread to be cut in the piece of work operated upon. The form of nut shown in Fig. 1 is a two-part adjustable nut and of "standard" pitch, although other forms may be used, if desired. From the above it may be seen that when the cylinder or supporting member 5 rotates with the master screw 29, the same will be given a simultaneous longitudinal movement or progression by reason of the master screw operating on the threads of the lead nut 31.

For the purpose of rotating the cylinders 5 and 10 the device is provided with a transversely mounted worm shaft 32 having a worm 33 thereon adapted, when rotated, to drive a gear 34 loosely mounted upon the cylinder 5 and relatively rotatable with respect thereto, an end of the worm shaft 32 having secured thereto a suitable belt pulley 35 by which the shaft 32 and the worm 33 may be normally driven.

The gear 34 is provided near its periphery with laterally extending spaced lugs 36 between which is disposed, in radial disposition, a pin 37 with the inwardly directed portion of the pin passing through an arc shaped slot 38 provided in the side of the cylinder 5 and with its inner end secured in any suitable manner to the cylinder 10, the slot 38 being of sufficient length or extent to permit a considerable amount of movement of the pin 37 therein for permitting relative rotation or angular movement between the cylinders 5 and 10. The cylinder or supporting member 5 is also provided with an angularly adjustable collar or band 39 located at a suitable distance from the pin 37 and provided on its periphery with a radially extending projection 40 and, substantially diametrically opposite thereto, with clamping ears 41 adapted to be secured together by any suitable means, such as screws 42, whereby the collar or band may be fixed or fastened to the cylinder 5 in any predetermined adjusted position for operative rotation therewith. The projection 40 is provided with a laterally extending projection 43 near the end of which is provided a threaded aperture adapted to receive a threaded abutment pin 44, the latter carrying a lock nut 45 for locking the abutment pin in adjusted position. The pin 37 extends radially from the slot 38 a sufficient distance for said pin, during its angular movement through the slot 38, to contact with the end of the abutment pin 44, further movement of the pin 37 being thereafter transmitted to the abutment pin 44, lateral projection 43, radial projection 40, the collar 39 and the cylinder 5. It may be observed from the above that the rotation of the cylinder 5 is derived from the shaft 32 through the gear 34, projections or lugs 36, pin 37, abutment pin 44, lateral projection 43, radial projection 40 and the collar or band 39.

On the opposite side of the gear 34 from that on which are located the lugs 36, is provided a laterally extending pin 46 to which may be secured an end of a coiled spring 47, the other end of the spring being secured to a radially extending pin 48 secured in the wall of the cylinder 5 at a suitable distance from the pin 46. The coiled spring 47 normally tends to contract and urge movement of the gear 34 relative to the cylinder 5, in a direction opposite to that produced by the rotation of the worm 33 when engaged with the gear 34.

The cylinder or supporting member 5 also carries a ring 49 suitably secured to said cylinder to rotate therewith by means of a pin 50, said ring being provided with a radial projection 51 adapted to contact with a laterally extending pin 52 fastened to an adjacently located auxiliary ring 53 loosely mounted upon the cylinder 5. It will be apparent from the above that upon the rotation of the cylinder 5, and consequently the ring 49, the radial projection 51 will engage with the laterally extending pin 52 of the auxiliary ring 53 to rotate the same and carry the projection 54, provided on the auxiliary ring 53, around or angularly into a position to contact with a collar 55 provided on a transversely mounted and longitudinally slidable rod 56 for tripping a releasable mechanism which holds the worm 33 normally in mesh with the worm gear 34. The worm shaft 32 is eccentrically mounted in a rotatable bearing support 57, also transversely mounted in casing 1, to which support is connected a coiled spring 58 normally tending to rotate the support 57 in a direction to move or carry the worm 33 out of engagement with the worm gear 34, the other end of the spring being suitably connected to a stationary pin 59 fixed to any appropriate part of the machine. The bearing support 57 is provided at one end with a plate 60 conveniently located outside of and adjacent to the casing of the machine, as clearly shown in Fig. 2, said plate being provided with an opening 61 through which normally projects an end of the slidable rod 56, thereby providing a means for suitably locking said plate and bearing support in the position in which the worm is normally in mesh with the gear 34, the end of the rod also being normally maintained in the opening 61 or in locked position by the coiled spring 62 interposed between the side wall of the casing 1 and the collar 55. It will thus be apparent that when the projection 54 on the ring 53, is carried around by the engagement of the radial projection 51 with the laterally extending pin 52 on the ring 53, the same will engage the collar 55 and move the slidable rod 56, while compressing the spring 62, from or out of the opening 61 provided in the plate 60. With the end of the rod 56 so released or withdrawn the coiled spring 58 is immediately free to rotate the eccentric bearing support 57 to carry the worm shaft 40 away from the gear 34 and disengage the worm 41 from said gear, as will be clearly apparent from an inspection of Figs. 1 and 2. The plate 60 may be provided with a handle 63 by which the plate may be manually returned to its locked position, thus bringing the opening 61 opposite the end of the rod 56 whereupon the end of the latter will be immediately projected into said opening by the expansion of the spring 62. The plate 60 may be further provided with radially extending pins 64 and 65 adapted to engage with the stop pins 66 and 67 secured to the side of the casing 1 at suitable points for limiting the angular movement of the plate 60 and the eccentric bearing support 57.

The cylinder or supporting member 5 has also attached thereto an end of a flexible belt or band 68 adapted to be wound about the cylinder 5, said band being provided at its other end with a weight 69. During the rotation of the cylinder 5 this belt is caused to wind upon the shaft 5 and to raise the weight 69. When the worm 33 is released from the gear 34 the weight 69, through the belt or band 68, immediately operates to give the cylinder 5 a returning rotation, in a direction opposite to that effective to wind said band about the cylinder 5, thereby bringing the cylinder, as well as the parts operatively connected thereto, to their initial or starting position.

For the purpose of providing the above described machine with means whereby tapered threads may be cut in a piece of work with a tapered cutting tool or a tool whose operating elements are disposed in tapered arrangement or located upon a tapered surface I have provided the machine with means now to be described. More particularly, I have provided in the radial projection 40 of the clamping band or collar 39 a taper controlling device comprising a wedge or tapered member 70 adapted to be interposed and forced in between the radial pin 37 and the abutment pin 44 so as to cause a relative movement therebetween, such action occurring simultaneously with the orbital or planetary movement of the cutter about the piece of work as well as its linear or longitudinal advance for giving the proper pitch to the threads. It will be apparent, therefore, that such relative movement of the pins 37 and 44 will cause a corresponding relative movement between the cylinders 5 and 10 so that the latter will gradually move the cutter radially with respect to the work at the proper rate so as to cause the threads to be cut in tapered arrangement or upon a tapered surface with the tapered cutter without any radial overlap or offset of the initial and terminal ends of the thread cuts but with the ends of the cuts meeting perfectly.

In the preferred form of device or attachment referred to I have provided in the projection 40 adjacent the lateral projection 43, a threaded opening in which I have mounted a tubular casing 71, such casing being provided with screw threads upon its surface to adapt the same for adjustable connection in said opening. (See Fig. 3). These threads offer a convenient means for adjustably securing the casing in the projection 40 and the lock nuts 72 and 73 are of utility to secure or lock said casing in adjusted position. Within the casing is located a plunger 74 with the rear end thereof extending from one end of the casing and contacting with a machined annular surface 75 provided on the inner end of the bearing housing 3. Within the casing is also located an expandible spring 71' one end of which bears against the shoulder 72' to normally urge the plunger against the contact surface 75 and the other against the flanged end 73' of the casing. The other end of the plunger is of reduced diameter and projects through a perforation provided at the other end of the casing, the terminal portion thereof being threaded to adjustably receive the wedge 70 and a lock nut 76, the latter being of utility to lock said wedge in adjusted position. The surface of the wedge which contacts with the abutment pin 44 may be substantially flat while the surface against which the radial pin 37 contacts may be slightly curved or rounded to compensate for the relatively angular movement which may arise between said pin and the surface of the wedge 70. From the above it will be apparent that when the cylinder 5, carrying the clamping band 39 and the radial projection 40, is rotated and also given a linear progression along the axis of the machine, the projection 40 and the attachment connected thereto also will be moved longitudinally but the plunger 74, by reason of its contact with the surface 75, will be held in stationary position so that the radial pin 37 and the abutment pin 44 will be forced to ride over the inclined surfaces of the wedge 70 thereby causing the radial pin 37 and the abutment pin 44 to move toward or away from each other in conformity with the direction of movement of the wedge. The effect of this movement is to cause the cylinder 10 to rotate in the cylinder 5 and gradually move the cutter transversely, that is, in a radial direction, to the axis of the work operated upon, as will hereinafter more clearly appear in the description of the operation of the machine.

Referring to Fig. 6 there is shown therein another form of means for accomplishing the same result, in which the cylinder is provided with a threaded ring 77 suitably splined to the cylinder 5 so that said ring will be caused to rotate therewith but will be adapted to slide longitudinally thereof. To the casing 1 is attached a stationary threaded nut segment 78, as by screws 79, adapted to engage with the threaded portions of the ring 77. The rear end of the plunger 74', in this form of device, contacts against the flat annular surface 80 provided on the ring 77. The latter and the nut segment 78 are provided, preferably, with a left hand thread, (while the master thread is of the right hand type), and of a pitch preferably twice that of the master thread. It is not necessary, however, that the pitch should be different from that of the master thread but it is preferable that it should be greater in order that the relative movement of the wedge and the abutment pins may be more rapid in some cases. In operation it will be apparent from the above that as the cylinder 5 is caused to rotate with the ring 77 the latter will be caused to operate on the threads of the nut segment 78 to move longitudinally in the direction opposite to that in which the cylinder 5 moves by reason of the linear progression imposed thereupon by the relative movement of the master thread and the lead nut, thereby causing the wedge to effect the requisite relative movement between the radial pin 37 and the abutment pin 34.

In the form of device shown in Fig. 7 the cylinder 15 is provided with a threaded ring 81 which may be conveniently secured, as by set screws 82, to said cylinder, whereby the ring 81 and the cylinder 5 rotate in unison. Between the ring 81 and the plunger 74″ is interposed an annular ring 83 loosely mounted upon the cylinder 5 and provided with a flat annular surface 84 against which the rear end of the plunger 74″ contacts. The ring 83 is provided with a pair of rigid, and preferably integral, threaded nut segments 85 and 86 cooperating with the threads of the ring 81. The nut segment 85 may be also provided with a groove 87 in which is adapted to relatively slide the fixed or stationary track 88 secured rigidly to the casing 1 by any suitable means, as the screws 89. The engagement of the track 88 in the groove 87 prevents angular or rotary movement of the ring 83 and the segment nuts 85 and 86 but permits longitudinal movement thereof relative to the axis of the cylinder 5. As in the form of device shown in Fig. 6 the threads of this attachment may be also left hand threads and of a greater pitch than that of the master screw, preferably twice the pitch thereof. In operation it will be apparent from the above that when the cylinder 5 is rotated the ring 81 will rotate therewith and cause a longitudinal movement of the ring 83 in a direction opposite to the linear progression of the cylinder 5 imposed thereupon by reason of the operation of the master screw with the lead nuts hereinbefore described. This movement will cause the plunger 74 to move the wedge relatively rapidly between the radial pin 37 and the abutment pin 44 with corresponding movement of the pin and abutment toward or away from each other. The effect upon the cutter is the same as that above described.

The clamping band or collar 39, as shown, may be provided with graduation marks by which the same may be relatively initially adjusted on the cylinder 5 with relation to the gauging arrow 90 for the particular depth of thread to be cut as may be determined upon when first operating the machine. The ring 81 shown in Fig. 7 is connected to the cylinder 5 by set screws in order that the ring may be initially angularly adjusted with relation to the cylinder 5 when an adjustment of the clamping band is also made in order that the plunger and the wedge may be located in the correct position with relation to the parts with which it cooperates.

In Figs. 1 and 8 is shown a cutting tool of the type known as a "female cutter." This tool is of annular form and is provided within the annular portion with a plurality of cutting members 91 each adapted to successively act upon a piece of work inserted in the cutter. When a cutter of the male type is used for cutting threads on the surface of a piece of work the amount of work being cut by the cutting elements is considerably less than that cut when using a female type of cutter as may be clearly seen in Fig. 8, wherein the cutting action starts at a point 92 and terminates at a point 93 the extent of material between these points which is thus operated upon at one time being considerably more than when a male cutter is used. The use of the female type of cutter in connection with a planetary thread cutting machine of the character herein disclosed is very desirable for the reason that increased production results from the use thereof as well as the cutting of a perfect or properly formed tapered thread. In the type of cutter shown the cutting elements of the cutting members 91 are arranged in an inclined or tapered disposition so that properly formed tapered threads may be cut upon a piece of work as clearly shown in Fig. 1.

In operation the pulley 28 rapidly rotates the shaft 16 and the cutter 27 in the cylinder 10. Initially or at the start of the operation the cylinder 10, relative to the cylinder 5, is so located that the axis of the shaft 16 is substantially in alinement with the dead center or coincident with the axis of the cylinder 5. When the worm 33 is thrown into engagement with the gear 34 the latter first operates, by way of the projections 36, to carry the pin 37 along the slot 38, provided in the cylinder 5, to turn the cylinder 10 in the cylinder 5 relatively thereto whereby the shaft 16 is caused to move in a direction substantially radially away from the axis of the cylinder 5, and in the form of device shown in Fig. 1, to raise the cutting tool with the cutting members 91 therein into operative contact with the lower surface of the piece of work 94. The relative movement of the cylinders 5 and 10 continues until the pin 37 contacts with the abutment pin 44 at which instant relative movement of the cylinders ceases and the cylinders 5 and 10 are thereafter caused to move in unison. The position of the clamping band or collar 39 on the cylinder 5 is previously predetermined so as to permit the free movement of the pin 37 in the slot 38 to an extent sufficient to cause the cutting members to enter the piece of work to the depth the threads are to be cut so that when the cutting members have reached the proper depth the pin 37 will then contact with the abutment pin 44, at which instant further radial movement of the shaft 16 and the cutting tool 27 is prevented. Further rotary movement of the gear 34 therefore causes a rotation of both the cylinders 5 and 10 so as to carry the shaft 16 and the cutting tool 27 along a circular or orbital path about the axis of the cylinder 5 during which time the cutter rapidly rotates to perform its cutting operation upon the piece of work.

During the rotation of the cylinder 5 the master thread 29 operates against the lead nut 30 to give the cylinder 5, as well as the cylinder 10, shaft 16 and the cutting tool 27, a linear progression with respect to the work for the purpose of giving the thread a pitch. Inasmuch as a tapered cutter is used for cutting the threads, if no provision were made for gradually moving the cutter radially with respect to the axis of the work as the cutter is linearly moved by the master screw and lead nut, the cutting elements of the cutter would continue to cut the thread with the same depth of cut as at the start so that the terminal end of a thread-cut would not register properly with the initial end of the adjacent thread cut, the latter beginning at a different radial distance from the axis of the work than that at which the other terminates, the cutter having been advanced or progressed one thread by the master screw. Therefore, by causing the wedge to produce a relative movement between the cylinders 5 and 10, the cutter is caused to move radially with respect to the axis of the work during the pitch progression or advance of the cutter so that the terminal ends of the advanced thread-cut will register or meet exactly without any overlap or offset in a radial direction. The taper of the wedge and the pitch of the screw-rings are chosen so as to give the proper amount of transverse recession of the cutter relative to the work for the particular taper and pitch of thread-cut through the relative movement of the cylinders 5 and 10.

As the cylinder 5 rotates in the direction of the arrow shown in Fig. 2 the ring 49 rotates therewith until the radial projection 51 is carried around substantially a complete circle or 360° and contacts with the laterally extending pin 52 on the auxiliary ring 53. The latter is then carried around with the former until the projection 54 on the auxiliary ring moves through an angle of substantially 90° when it in turn contacts with the collar 55 on the slidable rod 56, causing the latter to slide longitudinally thereof to release or disengage from the plate 60 whereupon the coiled spring 58 becomes immediately operative to rotate the eccentric bearing support 57 to disengage the worm 37 from the worm gear 34. Immediately upon the disengagement thereof the coiled spring 47 contracts to cause the radial pin 37 to move or recede through the slot 38 to its initial position whereby the cylinder 10 is rapidly rotated in the cylinder 5 to withdraw the shaft 16 and the cutting tool 27 from the piece of work. At the same time the weight 69 and the band 68, which has been wound about the cylinder 5 during its previous rotation, now operate to rapidly return or rotate the cylinder 5 with the parts carried thereby in reverse direction to its initial starting position. In doing this the radial projection 51 parts from the laterally extending pin 52 on the auxiliary ring 53 and turns through substantially a complete circle or 360° when the radial projection 51 contacts with the pin 52 on the opposite side thereof and carries the same with the auxiliary ring 53 in reverse direction from that originally imparted thereto until the projection 95 on the auxiliary ring 53 contacts with the cushion abutment 96, the projection 54 being withdrawn from the collar 55 on the slidable rod 56. The parts are now in their initial or original position. The reverse rotation of the parts above mentioned effects a reverse movement of all the parts connected thereto so that the cylinder 5 recedes helically and the tapered attachment relatively returns to its original position preparatory to again feeding the wedge between the radial pin 37 and the abutment pin 44 as previously described. Although I have herein referred more particularly to an embodiment of my invention so arranged that the cutter is given a linear movement inwardly from the end of the work and a simultaneous gradual radial retraction from the axis of the work, under certain conditions it is desirable to reverse these movements so that the linear movement of the cutter is toward the end of the work and the gradual radial movement toward the axis thereof, and such method of operation and arrangement of means for effecting the same are entirely within the scope and contemplation of my invention.

While I have herein disclosed with considerable particularity a certain embodiment of my invention, I do not desire or intend thereby to limit myself specifically to the details shown and described, as various changes and modifications may be made therein and in the arrangement of the various parts as required, while, additionally, it will be understood that other and equivalent forms are comprehended by my invention and may be employed if desired without departing from the spirit of my invention and the scope of the appended claims.

Having thus described my invention what I claim as new and desire to secure by Letters Patent is:

1. In a metal working mechanism, the combination of a tapered cutter adapted to simultaneously cut a plurality of threads in tapered relation in a piece of work, means to rotate said cutter about its axis, automatically operated means to cause a relative transverse movement between said cutter and the work whereby the cutter is moved into the work the required depth for the thread, automatically operated means to cause a relative helical movement between said cutter and said work, automatically operated means for causing a relative transverse movement between said cutter and the work during the helical movement of said cutter relative to said work for producing a tapered thread, and automatically operated means to release and return the three last mentioned means to initial starting position.

2. The combination of a tapered multiple cutting tool, means to rotate said cutting tool about its axis, automatically operated means to effect a conical helical movement of said cutting tool relative to the work operated upon and means for automatically releasing and returning said last mentioned means to initial starting position.

3. The combination of a tapered cutting tool, means to rotate said cutting tool about its axis, automatically operated means to cause said cutting tool to move towards the work operated upon to cause said cutter to enter the work for cutting the threads, automatically controlled means to limit said movement at the proper depth for the threads, automatically operated means to effect a helical movement of said cutting tool relative to said work, automatically operated means to simultaneously cause movement of said cutter radially to the axis of said work and automatic means to withdraw said tool from said work and to effect a reverse helical movement of said tool to initial starting position.

4. The combination of a tapered multiple cutting tool, means to rotate said cutting tool about its axis, automatically operated means to cause said cutting tool to move toward the work operated upon including means to limit the entry of said cutting tool into said work the proper depth to get the correct diameter of the threads, automatically operated means to effect a conical helical movement of said cutting tool relative to said work, means to automatically release and return said last mentioned means to initial starting position and means to automatically return the cutting tool to initial starting position.

5. In a thread cutting mechanism, the combination of a supporting member, a cylinder eccentrically mounted in said supporting member, a rotatable shaft eccentrically mounted in said cylinder, a tapered multiple cutter mounted on said shaft, means to rotate said cutter about its axis, automatically operated means to rotate said cylinder relative to said supporting member to move said rotating cutter into the work the depth for the thread to be cut, means on said supporting member adapted to limit the relative movement of said supporting member and said cylinder whereby further rotation of said cylinder causes a simultaneous rotation of said supporting member to give said cutter a planetary movement about said work, helical means secured to said support and mechanism for simultaneously giving said supporting member, said cylinder and said cutter a linear movement, means carried by said supporting member adapted to simultaneously vary the relative position of said cylinder and said limiting means and the relative position of said cutter and said work, automatically operated means to release and return said cylinder to initial position relative to said supporting member for withdrawing said cutter from said work, automatically operated means for returning said supporting member to initial starting position including means for automatically helically returning said supporting member, said cylinder and said cutter linearly.

6. In a multiple thread cutting mechanism, the combination of a cylindrical and rotatable supporting member, a cylindrical member eccentrically and rotatably mounted in said supporting member, a rotatable shaft eccentrically mounted in said cylindrical member, a tapered multiple cutter carried by said shaft, means to rotate said shaft and said cutter, abutment means carried by said supporting member, abutment means on said cylinder adapted to contact with said abutment means on said supporting member, means for rotating said cylinder relative to said supporting member until said abutment means contact with each other and for rotating said supporting member and said cylinder simultaneously after said contact, tapered means adapted to vary the relative position of said abutment means during the linear movement of said supporting member, said cylinder and said cutter, means carried by said supporting member and said mechanism for moving said supporting member, said cylinder and said cutter linearly during the rotation of said supporting member, automatic means to release the means for rotating said supporting member and said cylinder and means to automatically return said cutter, said shaft, said cylinder and said supporting member to initial starting position.

7. The combination of a tapered rotary multiple cutting tool, means to rotate said cutting tool about its axis, automatic means to move said cutting tool into and out of cutting engagement with the work operated upon, automatic means to revolve said cutting tool in an orbital path about said work, automatic means to simultaneously advance said cutting tool in a linear direction parallel to said axis, means carried by said revolving means adapted to be interposed between said second and third mentioned means during the simultaneous orbital and linear movement of said cutter relative to said work whereby said cutting tool is transversely moved relative to said work, automatic means for rendering inoperative said revolving means after a completion of an orbital movement and means for returning said cutting tool to initial starting position.

8. In a metal working mechanism, the combination of a tapered cutter to cut threads in a piece of work, means to give said cutter a planetary movement relative to said work, means to simultaneously move said cutter linearly relative to said work, means to transversely move said cutter into cutting engagement with said work and means to give said cutter a transverse movement during the planetary and linear movement thereof, said last mentioned means comprising a linearly movable member provided with a tapered end, resilient means normally urging said member to move in one direction and contact means against which the other end of said member constantly contacts.

9. In a metal working mechanism comprising a rotary cutter, means to move said cutter into cutting engagement with a piece of work, means to move said cutter in an orbital path about said work and means to simultaneously move said cutter linearly, the combination of a casing adjustably mounted in said second mentioned means, a plunger in said casing adapted to move longitudinally thereof, resilient means adapted to urge movement of said plunger in one direction, a tapered member adjustably mounted on one end of said plunger and means against which the other end of said plunger constantly contacts during the linear movement of said third mentioned means whereby said plunger and casing receive a movement relative to each other to cause said tapered member to effect a retrograde movement of said first mentioned means simultaneously with the movement of said second and third mentioned means.

10. In a metal working mechanism, the combination of a female cutter adapted to cut threads on a piece of work held in stationary position, means to give said cutter a planetary movement relative to said work, means to give said cutter a simultaneous linear movement while rotating about the work and means to return said cutter and said means to initial starting position.

11. In a metal working mechanism, the combination of a tapered female cutter adapted to cut tapered threads on a piece of work, means to move said cutter into cutting engagement with the piece of work, means to give said cutter a planetary movement relative to said piece of work, means for simultaneously moving said cutter toward or away from said piece of work for effecting a taper of the threads in said piece of work, means to give said cutter a simultaneous linear movement relative to said piece of work and means for returning said means to initial starting position.

12. In thread milling mechanism the combination with a female cutter adapted to form threads, of means for stationarily holding a piece of work in position to be operated on by said cutter, means to impart to said cutter a movement in a planetary orbit about said work, and means to advance said cutter linearly with respect to said work for a distance equal to the pitch of the thread to be cut simultaneously with said planetary movement, whereby a complete thread of any desired length is formed on the work.

13. In thread milling mechanism the combination with a tapered female cutter adapted to form threads, of means for stationarily holding a piece of work in position to be operated on by said cutter, means to impart to said cutter a movement in a planetary orbit about said work, means to advance said cutter linearly with respect to said work simultaneously with said planetary movement, means to gradually move said cutter in a direction transverse to the axis of said work during said movements, and means to automatically return said cutter to initial position.

14. In thread milling mechanism the combination with a female cuter adapted to form threads on a piece of work, of means for stationarily holding said work in position to be operated on by said cutter, means for automatically feeding said cutter into the work to the proper depth to form the required thread, means for imparting to the cutter a planetary movement about the work and a linear movement with respect to said work for a distance equal to the pitch of a single thread, and means for automatically disengaging the cutter from the work upon the completion of the thread.

15. In thread milling mechanism the combination with a female cutter adapted to form threads on a piece of work, of means for stationarily holding said work in position to be operated on by said cutter, means for automatically feeding said cutter into the work to the proper depth to form the required thread, means for imparting to the cutter a planetary movement about the work and a linear movement with respect to said work for a distance greater than the pitch of a single thread, and means for automatically disengaging the cutter from the work upon the completion of the thread.

16. In thread milling mechanism the combination with a female cutter adapted to form threads on a piece of work, of means for stationarily holding said work in position to be operated on by said cutter, means for automatically feeding said cutter into the work to the proper depth to form the required thread, means for imparting to the cutter a planetary movement about the work and a linear movement with respect to said work for a distance equal to the pitch of a single thread, means for automatically disengaging the cutter from the work upon the completion of the thread, and means for automatically returning the cutter to initial position.

17. In thread milling mechanism the combination with a tapered female cutter adapted to form threads on a piece of work, of means for stationarily holding the work in position to be operated on by said cutter, means for automatically feeding the cutter into the work to the proper depth to form the required thread, means for imparting to the cutter a planetary movement about and a linear movement with respect to the work, means for automatically disengaging the cutter upon the completion of the thread, and means for automatically returning the cutter to intial position.

18. In thread milling mechanism the combination with a cutter adapted to mill a thread on a piece of work, of means for stationarily holding the work in position to be acted upon by the cutter, means for rotating the cutter, means for automatically feeding the cutter into the work at the initiation of the cutting operation for a distance to produce the required depth of thread, means for imparting to the cutter while rotating a planetary movement about and a linear movement with respect to the work, and means for automatically gradually moving the cutter transversely with respect to the axis of the work to produce a tapered thread thereon.

19. In thread milling mechanism the combination with a cutter adapted to mill a thread on a piece of work, of means for stationarily holding the work in position to be acted upon by the cutter, means for automatically feeding the cutter into the work at the initiation of the cutting operation for a distance to produce the required depth of thread, means for imparting to the cutter while rotating a planetary movement about and a linear movement with respect to the work, means for automatically gradually moving the cutter transversely with respect to the axis of the work to produce a tapered thread thereon, and means for automatically disengaging the cutter from the work upon the completion of the thread.

20. In thread milling mechanism the combination with a cutter adapted to mill a thread on a piece of work, of means for stationarily holding the work in position to be acted upon by the cutter, means for rotating the cutter, means for automatically feeding the cutter into the work at the initiation of the cutting operation for a distance to produce the required depth of thread, means for imparting to the cutter while rotating a planetary movement about and a linear movement with respect to the work, means for automatically gradually moving the cutter transversely with respect to the axis of the work to produce a tapered thread thereon, means for automatically disengaging the cutter from the work upon the completion of the thread, and means for automatically returning the cutter to initial position.

21. In thread milling mechanism the combination with a tapered female cutter adapted to form threads, of means for stationarily holding a piece of work in position to be operated on by said cutter, means to impart to said cutter a movement around said work, means to advance said cutter linearly with respect to said work for a distance equal to the pitch of the thread to be cut and simultaneously with said movement, and means to gradually move said cutter in a direction transverse to the axis of said work during said movements whereby a complete tapered thread of any desired length is formed on the work.

22. In thread milling mechanism the combination with a tapered female cutter adapted to form threads, of means for stationarily holding a piece of work in position to be operated on by said cutter, means to impart to said cutter a movement about said work, means to advance said cutter linearly with respect to said work for a distance greater than the pitch of the thread to be cut and simultaneously with said movement, and means to gradually move said cutter in a direction transverse to the axis of said work during said movements whereby a complete tapered thread of any desired length is formed on the work.

23. In thread milling mechanism the combination with a female cutter adapted to form tapered threads, of means for stationarily holding a piece of work in position to be acted upon by said cutter, means to move said cutter about the work, and means to simultaneously move the cutter longitudinally of the work.

24. In thread milling mechanism, the combination with a cutter adapted to mill a thread on a piece of work, of means for holding the work in position to be acted upon by the cutter, means for rotating the cutter, means for feeding the cutter into the work at the initiation of the cutting operation for a distance to produce the required depth of thread, means for imparting to the cutter while rotating a planetary movement about and a linear movement with respect to the work, means for gradually moving the cutter transversely with respect to the axis of the work simultaneously with said aforesaid movements to produce a tapered thread thereon, and means for automatically returning the cutter to initial position following the completion of the thread.

25. In thread milling mechanism, the combination with a cutter adapted to mill a thread on a piece of work, of means for holding the work in position to be acted upon by the cutter, means for rotating the cutter, means for feeding the cutter into the work at the initiation of the cutting operation, means for imparting to the cutter while rotating a planetary movement about and a linear movement with respect to the work, and means for automatically gradually moving the cutter transversely with respect to the axis of the work to produce a tapered thread thereon.

26. In thread milling mechanism, the combination of a cutter adapted to form a thread in a piece of work, means for feeding the cutter to depth in the work, means to impart to the cutter a planetary movement about the work, means to impart to the cutter a linear movement with respect to the work, and automatically actuated means to gradually move the cutter transversely with respect to the axis of the work simultaneously with said other movements.

27. The method of milling tapered threads which comprehends effecting the support of the work on which the threads are to be formed, imparting an axial movement of rotation to a milling cutter of length substantially equal to the length of the thread to be formed on the work, and giving the cutter approximately a single revolution about the work while simultaneously moving the cutter linearly of and transversely to the axis of the work.

28. The method of milling a complete continuous tapered screw thread which comprehends supporting in a stationary position the work on which the thread is to be formed, imparting to a milling cutter a movement of rotation about its own axis and simultaneously giving the rotating cutter substantially a single revolution about the work while moving the cutter longitudinally of the work and in a direction transverse to the axis of the work.

29. The method of milling tapered threads which comprehends supporting the work upon which the threads are to be formed, imparting a movement of rotation about its own axis to a milling cutter, moving the cutter into the work for a depth proper to form the desired thread and thereafter imparting to the cutter simultaneous movements about the work, longitudinally of the work and transversely to the axis of the work.

30. The method of forming tapered milled threads which comprehends supporting in a stationary position the work on which the threads are to be formed, imparting to a suitable milling cutter a movement of rotation about its own axis, moving the rotating cutter into the work for a depth sufficient to form the desired thread and then simultaneously carrying the rotating cutter about the work in a planetary orbit and moving it longitudinally of the work and in a radial direction with respect to the work.

In witness whereof, I have hereunto set my hand this 20th day of September, 1919.

PETER P-G. HALL.